(No Model.)
H. F. DE B. CAMERON.
INSULATING SUPPORT FOR SECONDARY BATTERY ELECTRODES.
No. 395,311. Patented Jan. 1, 1889.
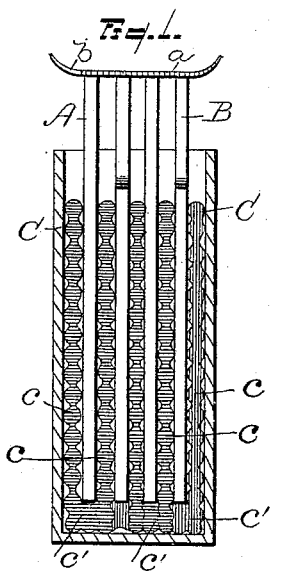
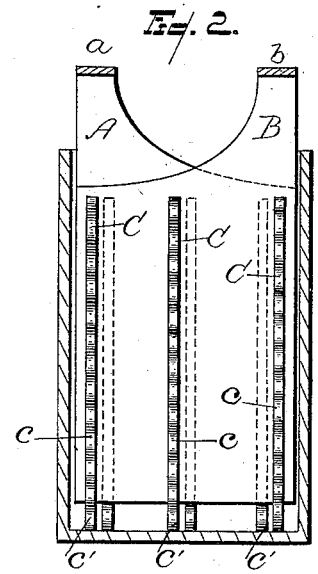
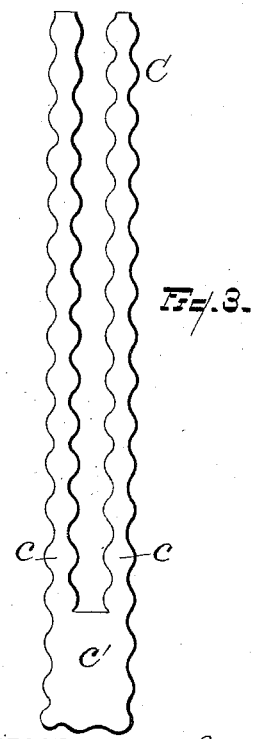
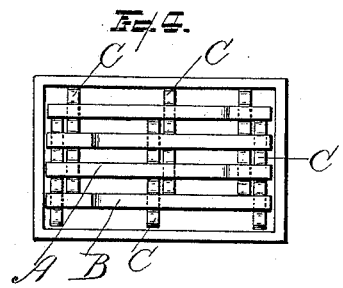
WITNESSES
Samuel E. Thomas
Th. B. O'Dogherty
INVENTOR
Henry F. deB Cameron
By Willi W. Jeggett
Attorney

UNITED STATES PATENT OFFICE.

HENRY F. DE B. CAMERON, OF DETROIT, MICHIGAN, ASSIGNOR TO THE WOODWARD ELECTRICAL COMPANY, OF SAME PLACE.

INSULATING-SUPPORT FOR SECONDARY-BATTERY ELECTRODES.

SPECIFICATION forming part of Letters Patent No. 395,311, dated January 1, 1889.

Application filed October 1, 1888. Serial No. 286,821. (No model.)

*To all whom it may concern:*

Be it known that I, HENRY F. DE B. CAMERON, a subject of the Queen of Great Britain, residing at Detroit, county of Wayne, State of Michigan, have invented a certain new and useful Improvement in Storage-Batteries; and I declare the following to be a full, clear, and exact description of the same, such as will enable others skilled in the art to which it appertains to make and use the same, reference being had to the accompanying drawings, which form a part of this specification.

In the drawings, Figure 1 is a side elevation and section, and Fig. 2 an end elevation and section, of a storage-battery cell and its elements embodying the invention. Fig. 3 is an enlarged view of the insulating-loop. Fig. 4 is a plan view of cell with the insulators in use.

In the manufacture and use of storage-batteries it is of primary importance to properly support the battery-plates, so that the positive and negative plates shall not come in contact with each other, and so that they shall stand free from the bottom of the cell. At the same time it is important that the said support shall not materially interfere with the electrical action upon all points of its adjacent elements, and finally means for insulating the said elements should be such as will admit of the ready removal of any particular element without disturbing the remainder.

It is the purpose of the invention to provide a means for thus insulating the elements of a storage-battery and accomplish the above ends.

To this end, A and B represent, respectively, the positive and negative elements of a storage-battery. When the battery is made up, the said elements A and B are connected together in the usual way by bars $a$ and $b$, or in any other convenient manner.

C represents the insulator, which constitutes the essential feature of the invention. It is composed of hard rubber or vitreous fiber, glass, or other non-conducting substance, although, because of the brittleness of glass, the rubber or vitreous fiber, &c., is preferable.

This insulator consists of two arms, $c$, united by a leg or connecting-head, $c'$. The arms $c$ are of fluted or crimped form, so as to bear against the adjacent elements only at the salient points of the said flutes or crimps, thus permitting a free action of the battery over the entire surface of the plates adjacent thereto. Said insulators are employed in the manner shown, there being two or more of them, into which the battery-plate is inserted between the two arms $c$, so as to rest upon the lower support or head, $c'$. The portion $c'$ projects down a short distance below the battery-plate, and so supports the plate free from the bottom of the cell. By this construction should any of the salts of lead become separated and fall to the bottom they would not operate to bridge over and so connect the adjacent positive and negative plates. The said loops serve to hold the elements free from each other, yet are of such character that any one may be drawn out and replaced by a new one, or a loop may be inserted at any point where by reason of the warping of the plates or otherwise its presence might be regarded as desirable. Again, should any element become deranged, it may be disengaged from its connecting-bar, $a$ or $b$, and with its loops be removed from the cell and a new plate substituted.

What is claimed is—

1. In a storage-battery, the combination, with its elements, of insulators C, said insulators consisting of a number of separate loops having their heads $c'$ at the bottom of the battery adapted to receive and hold the elements free from said bottom, and also so arranged that any one of the elements may be removed from the battery with its inclosing loop or loops without disturbing the other elements, substantially as described.

2. In a storage-battery, the combination, with its elements, of insulators, each of said insulators made in the form of a loop, the portions $c'$ of which sustain and hold the battery-plate free from the bottom of the cell and provided with fluted arms $c$, standing up upon both sides of the element, substantially as described.

3. The insulator C for storage-battery elements, the same composed of hard rubber or equivalent insulating material, having a head, $c'$, for supporting a battery-plate free from the bottom of the cell with fluted arms $c$, adapted to stand up along the sides of a battery element, substantially as and for the purpose described.

In testimony whereof I sign this specification in the presence of two witnesses.

HENRY F. DE B. CAMERON.

Witnesses:
   ISRAEL T. COWLES,
   W. H. CHAMBERLIN.